UNITED STATES PATENT OFFICE.

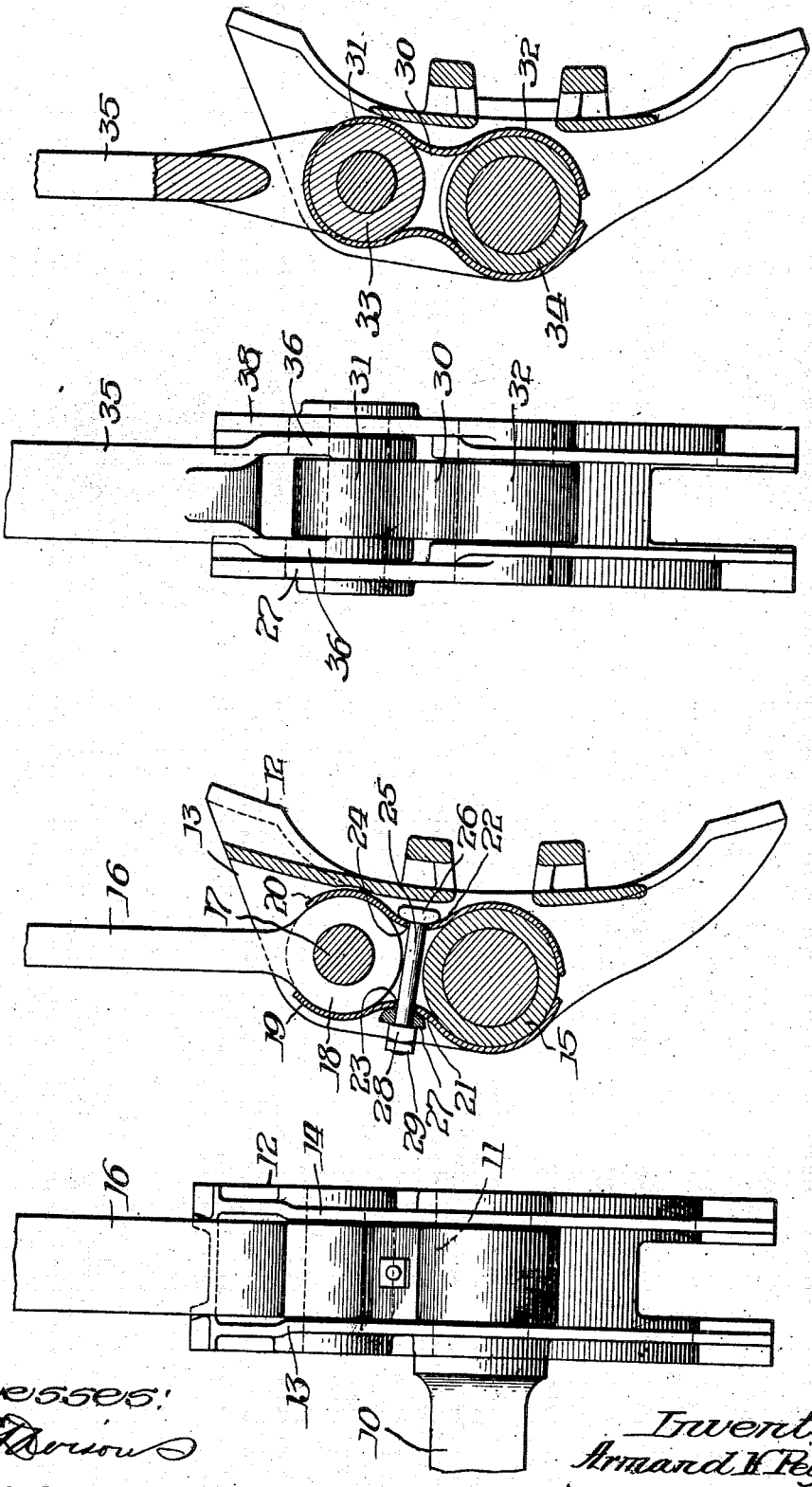

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

ADJUSTABLE BRAKE-HEAD MEANS.

1,278,996.   Specification of Letters Patent.   Patented Sept. 17, 1918.

Application filed November 17, 1917. Serial No. 202,498.

*To all whom it may concern:*

Be it known that I, ARMAND H. PEYCKE, a citizen of the United States, and resident of Chicago, in the county of Cook and State of Illinois, have invented certain new and useful Improvements in Adjustable Brake-Head Means, of which the following is a specification.

This invention relates to brake mechanism, and more particularly to a novel brake head and hanger arrangement.

One of the objects of the invention is to improve and simplify means whereby a brake head normally may be held yieldably in any given position.

Another object is to connect brake heads and hangers in a novel manner, making the same more durable and at the same time occupying a minimum amount of space.

Another object is to provide a novel combination of a brake head and hanger to meet the various requirements for successful commercial operation.

Generally speaking, these and other objects are accomplished by providing in brake mechanism, the combination of a brake head, a hanger connected thereto, and means extending between said hanger and brake head trunnion bearing for yieldably holding the brake head in a given position.

The invention is illustrated on the accompanying sheet of drawings, in which—

Figures 1 and 2 are rear and side elevations, respectively, of a brake mechanism embodying my invention, some of the parts in Fig. 2 being shown in section; and, Figs. 3 and 4 are rear and side elevations, respectively, of a modification of my invention, some of the parts being shown in section in Fig. 4.

The various novel features of the invention will be apparent from the following description and drawings and will be particularly pointed out in the appended claims.

Referring first to Figs. 1 and 2 of the drawing, it will be noted that I have provided a brake beam 10 having a trunnion 11 upon which is adjustably rotatably mounted a brake head 12 having side walls 13 and 14 with central bearing portions 15 which receive the brake beam trunnion 11. Pivotally connected to the head 12 above the trunnion bearing 15 is a hanger 16 which may be connected to any part of the truck for supporting the brake beam and heads. The pivotal connection between the brake head and hanger is made by a pin 17 which extends between the side walls 13 and 14 of the head and extends through the lower eye portion or bearing portion 18 of the hanger.

In order at all times to maintain the braking surface of the brake shoe in concentricity with the tire of the associated wheel and also to prevent uneven wear on the brake shoe, it is necessary that the brake head be mounted for an adjustable movement about a supporting member. At the same time normally the braking head must not be permitted too free movement relative to its support. Preferably the brake head should be yieldably held in its adjusted position or in any other position which it may assume in accordance with working conditions. To this end I have provided yieldable means which extends between the brake head trunnion bearing 15 and the hanger 16.

Referring particularly to Figs. 1 and 2 of the drawings, it will be noted that I have provided a plurality of spring plates 19 and 20 which engage opposite sides of the head trunnion bearing 15 and the bearing or eye portion 18 of the hanger 16. The intermediate portions 21 and 22 of the spring plates 19 and 20 are necked or grooved down toward each other and are provided with apertures 23 and 24 for the reception of a bolt 25 having a head 26 with a rounded under surface for engaging the outer concave surface of one of the spring plates 20. Fitting over the opposite end of the bolt 25 is a washer 27 having a curved under portion for engaging the outer concave surface of the spring 19. A nut 28 is threaded onto the end of the bolt 25, whereby the spring plate members 19 and 20 may be drawn into engagement with the brake head trunnion bearing 15 and hanger bearing 18 to any desired degree for regulating the frictional engagement between the parts in question. A lock nut 29 is provided for maintaining the frictional pressure constant for any one setting. The outer ends of the spring plates are bent to conform to the shape of the brake head trunnion bearing 15 and the hanger bearing 18 whereby these portions are embraced by the spring plates. By means of this arrangement it is apparent that the brake head is held yieldably in any adjusted position to maintain the brake shoe in concentricity with the tire of the associated wheel, the friction being great enough to hold the brake head in any given adjusted position and still being small enough to permit the brake shoe automatically to assume its proper position under operating conditions.

By referring to Figs. 3 and 4, it will be noted that substantially the same arrangement is shown with the exception, however, that instead of providing two spring plates I have provided a single continuous spring plate 30 having substantially two loop portions 31 and 32 which embrace the hanger bearing 33 and the head trunnion bearing 34, respectively. In this case the pressure and friction is dependent wholly upon the strength of the spring. It will be noted that the hanger 35 is of the jaw type having the spring plate 31 passing between the jaw members 36, which jaw members also are located between the sides 37 and 38 of the brake head. In effect the operation of the arrangement shown in Figs. 3 and 4 is substantially the same as that shown in Figs. 1 and 2.

It is evident that there may be various modifications of the invention herein particularly shown and described, and it is my intention to cover all such modifications which do not depart from the spirit and scope of the invention as set forth in the following claims.

I claim:

1. In brake mechanism, the combination of a brake head, a hanger connected thereto, and means extending between said hanger and the brake head trunnion bearing for yieldably holding the brake head in a given position.

2. In brake mechanism, the combination of a brake head, a hanger pivotally connected thereto, and yieldable means extending between said hanger and the brake head trunnion bearing for frictionally holding the brake head in a given position.

3. In brake mechanism, the combination of a brake head, a hanger pivotally connected thereto, and means extending between and engaging the hanger bearing and brake head trunnion bearing for yieldably holding the brake head in a given position.

4. In brake mechanism, the combination of a brake head, a hanger pivotally connected thereto, and means embracing portions of said hanger and brake head for yieldably holding one of the same in a given position.

5. In a brake mechanism, the combination of a brake head, a hanger pivotally connected thereto, and means embracing the brake head trunnion bearing and hanger bearing for yieldably holding the brake head in a given position.

6. In brake mechanism, the combination of a brake head, a hanger pivotally connected thereto, a plurality of members engaging portions of said brake head and hanger, and means for increasing the intimacy of said engagement for regulating the force by which the brake head is held.

7. In brake mechanism, the combination of a brake head, a hanger pivotally connected thereto, a plurality of resilient members engaging portions of said brake head and hanger, and means for varying the grip of said resilient members on said portions of the brake head and hanger.

8. In brake mechanism, the combination of a brake head, a hanger pivotally connected thereto, and resilient means looped around portions of said hanger and head for yieldably holding the head in a given position.

9. In brake mechanism, the combination of a brake head, a hanger pivotally connected thereto, and resilient means looped around and embracing the brake head trunnion bearing for yieldably holding the brake head in a given position.

10. In brake mechanism, the combination of a brake head, a hanger pivotally connected thereto, resilient means looped around and embracing the brake head trunnion bearing and hanger bearing for yieldably holding the brake head in a given position, and means for varying the grip of said resilient means on said brake head and hanger bearings.

Signed at Chicago, Illinois, this 8th day of November, 1917.

ARMAND H. PEYCKE.

Witnesses:
CHAS. L. BYRON,
A. F. WADE.